United States Patent
Watson

(10) Patent No.: US 8,341,820 B2
(45) Date of Patent: *Jan. 1, 2013

(54) COMPOSITE PIPE

(76) Inventor: William R. Watson, Tacoma, WA (US)

( * ) Notice: Subject to any disclaimer, the term of this patent is extended or adjusted under 35 U.S.C. 154(b) by 61 days.

This patent is subject to a terminal disclaimer.

(21) Appl. No.: 12/657,079

(22) Filed: Jan. 13, 2010

(65) Prior Publication Data

US 2010/0116373 A1 May 13, 2010

Related U.S. Application Data

(60) Continuation of application No. 11/904,873, filed on Sep. 28, 2007, now Pat. No. 7,987,576, which is a division of application No. 11/132,928, filed on May 18, 2005, now Pat. No. 7,563,496.

(51) Int. Cl.
*B23P 11/02* (2006.01)
*F16L 9/14* (2006.01)

(52) U.S. Cl. .......................... 29/447; 138/140

(58) Field of Classification Search .................... 29/447, 29/525, 506, 507, 234; 428/35.7, 34.7; 405/216, 405/211.1; 138/140, 149, 151, 98; 277/615; 285/330, 351

See application file for complete search history.

(56) References Cited

U.S. PATENT DOCUMENTS

| | | | |
|---|---|---|---|
| 6,779,287 B2* | 8/2004 | Venegas, Jr. | 40/607.01 |
| 7,563,496 B2* | 7/2009 | Watson | 428/35.7 |
| 2005/0143240 A1* | 6/2005 | Tan et al. | 492/56 |

* cited by examiner

*Primary Examiner* — John C Hong
(74) *Attorney, Agent, or Firm* — Charles J. Rupnick Attorney at Law

(57) ABSTRACT

A sleeved composite pipe or piling structure formed of an elongated polyethylene pipe or tube of high-density polyethylene (HDPE) or another polyethylene material installed over a substantially rigid and incompressible hollow metal pipe or solid wood core having an outer diameter that is the same or slightly larger than a normal inside diameter of the polyethylene pipe or tube when measured in a relaxed state at ambient temperature. The polyethylene pipe or tube is, for example, a HDPE 3408 material formed of virgin PE 3408 resin as specified in ASTM D3350 with UV protection, and the pipe is produced to ASTM A-3408. The metal pipe core can be ferrous or nonferrous pipe.

19 Claims, 7 Drawing Sheets

COMPOSITE PIPE

This application is a Continuation and claims priority benefit of copending parent U.S. patent application Ser. No. 11/904,873 filed in the name of William R. Watson, the common inventor hereof, on Sep. 28, 2007 now U.S. Pat. No. 7,987,576, the complete disclosure of which is incorporated herein by reference, which is a Divisional and claims priority benefit of parent U.S. patent application Ser. No. 11/132,928 filed in the name of William R. Watson, the common inventor hereof, on May 18, 2005, now U.S. Pat. No. 7,563,496 issued Jul. 21, 2009, the complete disclosure of which is incorporated herein by reference.

FIELD OF THE INVENTION

The present invention relates to a composite pipe device, and in particular to a sleeve of high-density polyethylene (HDPE) pipe compression fit over a metal pipe or solid core.

BACKGROUND OF THE INVENTION

Corrosion has always been a problem for metal pipe, especially those buried underground or driven into the sea floor for use as pilings. Even galvanized pipe corrodes over time as the thin galvanic coating wears away. Different composite pipe devices are also known, including pipe devices having a plastic shell extruded over the pipe. However, known plastic-metal composite pipe is formed of recycled material extruded over pipe of undetermined structural quality, which results in an composite pipe of unknown quality that requires further testing and certification for use in many industrial applications.

SUMMARY OF THE INVENTION

The present invention overcomes the manufacturing and load capacity limitations of the prior art by providing a sleeved or "jacketed" composite pipe structure formed of an elongated polyethylene pipe or tube of high-density polyethylene (HDPE) or another polyethylene material installed over a substantially rigid and incompressible steel or other metal pipe core having an outer diameter that is the same or slightly larger than a normal inside diameter of the polyethylene pipe or tube when measured in a relaxed state at ambient temperature. The polyethylene pipe or tube is, for example, a HDPE 3408 material formed of virgin PE 3408 resin as specified in ASTM D3350 with UV protection, and the pipe is produced to ASTM A-3408. The metal pipe core can be ferrous or nonferrous pipe.

According to one aspect of the invention, the wherein the elongated polyethylene pipe or tube is pre-heated to expand its inside diameter and soften the material. The elongated polyethylene pipe or tube is slid, possibly under some axial force or pressure, over the piling or pipe. Sliding the elongated polyethylene pipe or tube over the larger diameter core further expands its inside diameter to larger than its relaxed state measurement. After installation over the core, the elongated polyethylene pipe or tube is permitted to relax and contract or "shrink" radially, whereby the polyethylene pipe or tube radially compresses the outside of the substantially rigid and incompressible core pipe. When pre-heated, the inside diameter of the polyethylene pipe or tube contract or shrinks radially upon cooling to form a compression fit around the rigid core.

According to one aspect of the invention, the core is alternatively a wooden post for use as a pile.

According to another aspect of the invention, when the wood piling or steel pipe is to be used as a piling, the polyethylene pipe or tube is extended to or past the ends of the core pipe, and the open ends of the polyethylene pipe or tube are closed by plastic caps that are thermal fusion plastic welded or chemically welded in a water-tight manner. When the steel pipe is to be used in a string to form a pipe line, the steel pipe is extended beyond the polyethylene pipe or tube to expose short length of the core pipes, adjacent pipes are steel welded or otherwise joined, and "clamshell" portions of polyethylene material is chemically or thermal fusion welded between the polyethylene pipe or tube of adjacent pipes in a water-tight manner.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

Figure 1:
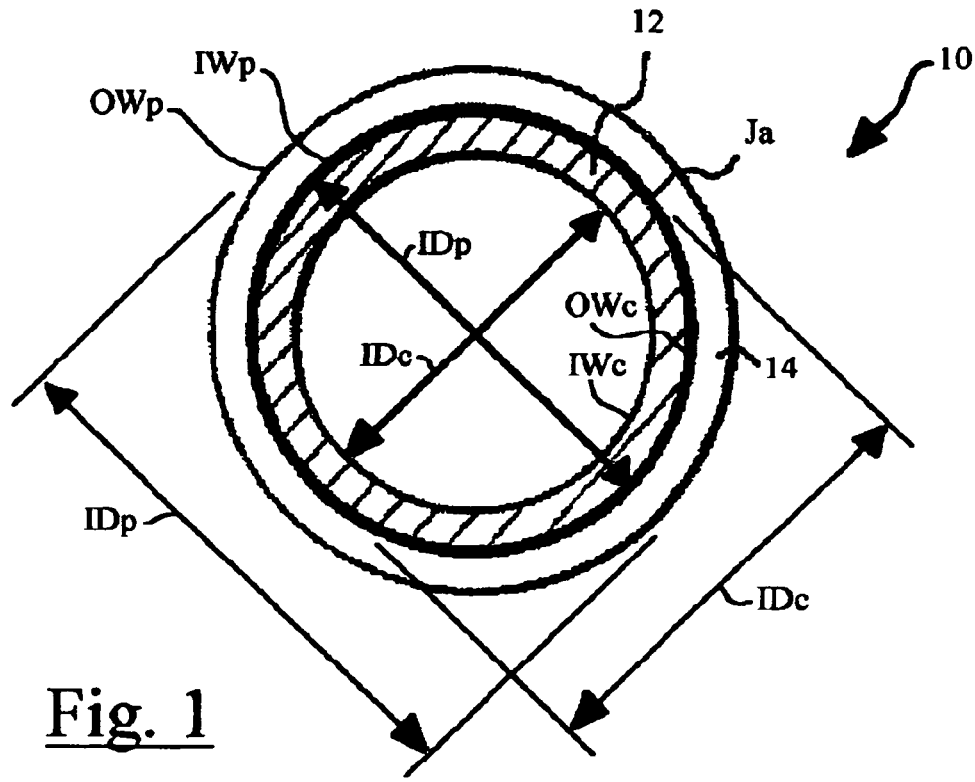
FIG. 1 is an end view that illustrates the present invention by example and without limitation embodied as a composite structural device formed of an elongated substantially cylindrical hollow pipe core material having an outer peripheral skin formed of a sleeve of seamless extruded or seam welded plastic pipe that is adhered to the core material by friction caused by radial compression.

FIG. 1 is an end view that illustrates the present invention by example and without limitation embodied as a composite structural device formed of an elongated substantially cylindrical hollow pipe core material having an outer peripheral skin formed of a sleeve of seamless extruded or seam welded plastic pipe that is adhered to the core material by friction caused by radial compression.

As illustrated in FIG. 1, the composite structural device 10 of the invention is formed of an elongated substantially cylindrical metal pipe core 12 having an outer peripheral skin formed of a sleeve of seamless extruded or seam welded plastic pipe 14. The plastic pipe sleeve 14 is adhered to the metal pipe core 12 by intersurface friction caused by radial compression that results from the plastic pipe sleeve 14 having a nominal inside diameter $ID_p$ before installation that is the substantially same or smaller than an outside diameter $OD_c$ of the metal pipe core 12, and a "memory" or tendency to return or "shrink" to its nominal inside diameter $ID_p$, after installation.

According to one embodiment of the invention, the metal pipe core 12 is a ferrous material, such as any grade of carbon or stainless steel, ductile iron, a nickel-based ferrous material such as Inconel® which refers to a family of trademarked high strength austenitic nickel-chromium-iron (NiCrFe) alloys that contain high levels of nickel and can be thought of as super-stainless steels having exceptional anti-corrosion and heat-resistance properties for use in a variety of extreme applications including navy boat exhaust ducts, submarine propulsion motors, undersea cable sheathing, heat exchanger tubing and gas turbine shroud rings, as well as other ferrous materials. According to other embodiments of the invention, the metal pipe core 12 is a nonferrous material, such any grade of aluminum or aluminum alloy.

According to one embodiment of the invention, the plastic pipe sleeve 14 is formed of a thermoplastic material that is weldable in a water-tight manner by means of thermal fusion plastic welding or chemical welding (hereinafter "plastic welding"). For example, according to one embodiment of the invention, the plastic pipe sleeve 14 is pressure-rated thermoplastic pipe, such as polyethylene pipe (PE) including high-density polyethylene (HDPE), ultrahigh molecular weight (UHMW) PE and cross-linked PE plastic piping materials. Such thermoplastic materials are widely used because of their chemical resistance, freeze resistance, impact and abrasion resistance, stress absorption properties, and weathering capabilities including resistance to sunlight and ultraviolet (UV) attack, but also because of their low cost and, because these materials are chemically inert, they are even approved for use around fish and plants. These thermoplastic pipe materials are commercially available in low, medium and high density (Type II and Type III). Their low cost is due in part to their fabrication which is usually by extrusion of seamless pipe, but may be by rolled sheets with heat-fused joints that result in an exceptionally smooth inner surface within the pipe.

Ultrahigh molecular weight (UHMW) PE and cross-linked PE plastic piping materials are a relatively new developments in PE piping. The UHMW PE has considerably higher resistance to stress-cracking but is more costly than conventional PE piping material. It offers an extra margin of safety when used in sustained pressure conditions in comparison with pipe made from lower molecular weight resin. It is suitable for certain applications in the chemical industry where stress-cracking resistance has been a limiting factor for the conventional PE pipe.

Cross-linked PE piping material, when compared to ordinary PE pipe, displays greater strength, higher stiffness and improved resistance to abrasion and to most chemicals and solvents at elevated temperatures up to 95 degrees C. (203 degrees F.). Pipe made from cross-linked PE also has high-impact resistance even at sub-zero temperatures. It is used in applications too severe for ordinary PE pipe and is strong enough for joining by threading.

High-density polyethylene (HDPE) piping material is made from a crystalline resin or polymer known for its flexibility, toughness and chemical resistance. These features make HDPE pressure pipe well suited for those applications or industries requiring a pipe that is strong, durable, corrosion resistant and yet at the same time flexible enough to be assembled and installed in the most inaccessible and harsh environments. HDPE pressure pipe is the preferred pipe of choice for most trenchless technologies like pipe bursting and horizontal direction drilling. HDPE pressure pipe is a common choice for projects requiring a piping solution that must be able to cope with extreme pressure loads under harsh conditions.

HDPE 3408 is one example of high-density polyethylene (HDPE) high pressure piping material. HDPE 3408 is a premium quality, high density, extra high molecular weight (EHMW) black polyethylene pipe that is specifically intended for the rigors of the oil field. It is produced from virgin PE 3408 resin as specified in ASTM D3350 and contains carbon black for superior resistance to UV degradation. HDPE 3408 pipe is manufactured in accordance with the ASTM A-3408 standard, as well as AWWA, ASTM, FM, CSA, BNQ, and NSF Standards. HDPE 3408 pipe offers outstanding environmental stress crack resistance, the highest chemical resistance of any polyethylene pipe and high impact resistance, and is made tough enough to easily handle pressure fluctuation and line surges. HDPE 3408 pipe diameters are known to range from ½ inch to 6 inch coiled, and ½ inch to at least 54 inch straight lengths.

HDPE 3408 black polyethylene pipe is manufactured to withstand extended outdoor storage and above-ground use in most climates by dispersion of fine carbon black which is the most effective additive for protecting polyethylene from the effects of weathering. By example and without limitation, one commercially available brand of HDPE 3408 black polyethylene pipe includes a minimum of 2 percent finely dispersed carbon black. Such UV-stabilized HDPE pipe can be exposed for long periods of time without decline in performance level. Weathering capabilities of HDPE pipe also include freeze resistance.

The virgin PE 3408 is a microbiological resistant polyethylene resin that offers optimum chemical resistance so that pipe made of HDPE PE-3408 easily withstands high acid soils and fertilizers and is capable of handling the transfer of extremely corrosive materials, e.g., industrial wastes and chemical acids. Because HDPE is resistant to a broad range of chemicals in varying degrees of concentration, sunlight and UV attack, as well as being approved for use with fish and plants, it is known as an excellent application for leach pads, wastewater ponds, landfills, aquaculture systems, landfill covers, secondary containment and tanks.

HDPE PE 3408 pressure pipe is manufactured from a high density polyethylene polymer of a molecular structure having much longer chains with fewer side branching when compared to ordinary polyethylene piping material so that HDPE PE 3408 pressure pipe has greater density and a crystallinity level in the range of 85 percent. As a rule, when the density increases, the stiffness, harness, strength, heat distortion point, and ability to transmit gasses increases. When density decreases, impact strength and stress crack resistance increases, where stress cracking is a surface change that polyethylene undergoes when exposed to oils, gasoline and other hydrocarbons. HDPE PE 3408 pressure pipe is rated at a density range of 0.941 to 0.965 gr/cc and is therefore superior in stiffness, hardness and strength which causes it to be ideal for pressure applications. Most importantly, HDPE PE 3408 pressure pipe can handle greater pressures under extremely corrosive conditions. For example, HDPE PE 3408 pressure pipe can be buried to great depths and can tolerate severe soil strain and soil movements (rise or settlement), and is even seismically qualified in laboratory studies and field proven to be earthquake tolerant.

Table 1 illustrates typical physical properties of high density polyethylene pipe, as provided by Chevron Phillips Chemical Company. This list of typical physical properties shown in Table 1 is intended for basic characterization of the material and does not represent specific determinations of specifications. The physical properties values reported in Table 1 were determined on compression molded specimens prepared in accordance with Procedure C of ASTM D 1928 and may differ from specimens taken from pipe. In some instances, testing may have been discontinued because no failures and no indication of stress crack initiation occurred.

Medium density polyethylene is an alternative piping material for the plastic pipe sleeve 14 of the invention. According to one embodiment of the invention, a minimum carbon black content of 2.5 percent provides excellent protection from UV rays and harsh weather conditions. Medium Density Polyethylene has a 20 year average life and puncture and tear strengths that far exceed common polyethylene or vinyl films. Medium Density Polyethylene is commonly used for larger ponds, including lagoons, canal liners, fire ponds, remediation liners, cargo covers, oil field pit liners, silage covers, outdoor covers, brine ponds, mine trailing ponds, interim landfill caps, leachate collection ponds.

Polyethylene piping material is quickly and easily joined and installed by using the heat fusion method which produces a solid, leak-proof joint that is as strong as the base pipe.

While the molecular structure of HDPE pipe gives it certain advantages over other plastic pipe for the plastic pipe sleeve 14 of the invention, the only absolute requirement of the invention is the plastic pipe sleeve 14 must expand radially to admit the core 12 thereinto, and thereafter radially contract to bring an inner wall surface $IW_p$ of the plastic pipe sleeve 14 into a compressive contact with an outer wall surface $OW_c$ of the core 12. Accordingly, different plastic pipes are alternatively substituted for the HDPE pipe, HDPE PE 3408 pressure pipe, UHMW PE pipe, medium density polyethylene pipe, cross-linked PE pipe or other polyethylene piping materials described herein.

According to one embodiment of the invention, the plastic pipe sleeve 14 is a acrylonitrile-butadiene-styrene (ABS) pipe, which is a copolymer made from the three monomers described in the heading, and contains at least 15 percent of acrylonitrile. ABS is a rigid plastic with good impact resis-

TABLE 1

| Property | Specification | Unit | Nominal Value |
|---|---|---|---|
| Material Designation | PPI/ASTM | | PE 3408 |
| Material Classification | ASTM D-1248 | | III C 5 P34 |
| Cell Classification | ASTM D3350-99 | | 345464C |
| -Density (3) | ASTM D-1505 | gm/cm3 | 0.955 |
| -Melt Index (4) | ASTM D-1238 (216 kg/190 C.) | gm/10 min. | 0.11* |
| -Flex Modulus (5) | ASTM D-790 | psi | 135,000 |
| -Tensile Strength (4) | ASTM D-638 | psi | 3,200 |
| PENT (6) | ASTM F-1473 | Hours | >100 |
| -HDB @73, F (4) | ASTM D-2837 | psi | 1,600 |
| -HDB @ 140 Deg F | ASTM D-2837 | psi | 800 |
| -U-V Stabilizer (C) | ASTM D-1603 | % C | 2.5 |
| Hardness | ASTM D-2240 | Shore "D" | 65 |
| Compressive Strength (yield) | ASTM D-695 | psi | 1,600 |
| Tensile Strength @ Yield (Type IV Spec.) | ASTM D-638 (2"/min.) | psi | 3,200 |
| Elongation @ Yield | ASTM D-638 | %, minimum | 8 |
| Tensile Strength @ Break (Type IV Spec.) | ASTM D-638 | psi | 5,000 |
| Elongation @ Break | ASTM D-638 | %, minimum | 750 |
| Modulus of Elasticity | ASTM D-638 | psi | 130,000 |
| PENT (6) | ASTM F-1473 | Hours | >100 |
| (Cond. A, B, C: Mold. Slab) | ASTM D-1693 | Fo, Hours | >5,000 |
| (Compressed Ring-pipe) | ASTM F-1248 | Fo, Hours | >3,500 |
| Slow Crack Growth | Battelle Method | Days to Failure | >64 |
| Impact Strength (IZOD) (.125O Thick) | ASTM D-256 (Method A) | In-lb/in notch | 42 |
| Linear Coefficient of Thermal Expansion | ASTM D-696 | in/in/F. | $1.2 \times 10^{-4}$ |
| Thermal Conductivity | ASTM D-177 | BTU-in/ft$^2$/hrs/ degrees F. | 2.7 |
| Brittleness Temp. | ASTM D-746 | degrees F. | <-180 |
| Vicat Soft. Temp. | ASTM D-1525 | degrees F. | 257 |
| Heat Fusion Cond. | ASTM D-1525 | @ psi degrees F. | 75 @ 400 |

*Average Melt Index value with a standard deviation of 0.01 tance at lower temperatures down to −40 degrees C. (−40 degrees F.) and can be used at temperatures up to 80 degrees C. (176 degrees F.). ABS is utilized mainly for drain-waste-ventilation (DWV) pipe and fittings but it is also used in solvent cement for installing pipe in various applications. ABS pipe can be joined by solvent welding or threading. A new development in the ABS-DWV piping industry is the co-extruded foam-core ABS pipe that is also useful for practicing the invention. ABS-DWV has a foam core sandwiched between solid skins and is useful as sewer, conduit and duct pipe. The foam-core ABS-DWV pipe has lower resin requirements than conventional ABS pipe.

According to another embodiment of the invention, the plastic pipe sleeve 14 is a polybutylene (PB) pipe, which has practically no creep and has excellent resistance to stress cracking. Polybutylene plastic pipe is flexible, and in many respects similar to Type III polyethylene, but is stronger. Polybutylene plastic piping is relatively new, and thus far its use has been limited to the conveyance of natural gas and to water distribution systems. High temperature grade polybutylene plastic pipe can resist temperatures of 105 to 110 degrees C. (221 to 230 degrees F.).

According to another embodiment of the invention, the plastic pipe sleeve 14 is a polypropylene (PP) piping, which is the lightest-weight plastic material, having a density of 0.90 g/cm$^3$, and generally has better chemical resistance than other plastics. Polypropylene is used in some pressure piping applications, but its primary use is in low pressure lines. Polypropylene plastic pipe is used for chemical (usually acid) waste drainage systems, natural-gas and oil-field systems, and water lines. The maximum temperature for non-pressure polypropylene piping is 90 degrees C. (194 degrees F.). Pipe lengths are joined by heat fusion, threading, e.g., with heavy pipe, and mechanical seal devices.

According to other embodiments of the invention, the plastic pipe sleeve 14 is another thermoplastic used in the manufacture of pipe, including poly(vinylidene chloride), poly(vinylidene fluoride), cellulose acetate butyrate (CAB), acetal homopolymer resins, rubber-modified systems, polytetrafluoroethylene (PTFE), and fluorinated ethylene-propylene (FEP) copolymer. However, these materials are relatively more expensive.

When the plastic pipe sleeve 14 is practiced using one of the thermoplastic piping options, such as polyethylene and in particular HDPE PE 3408 pressure pipe, sleeves 14 of two composite pilings 10 are easily fusion welded together with weld joints as strong as the original pipe whereby the thermoplastic piping is a monolithic or one piece piping solution. This monolithic thermoplastic piping solution is ideal for corrosive applications compared to other piping materials such as galvanized steel pipe which can wear through in time making them susceptible to possible leaks or pressure failure. Secondly, when the plastic pipe sleeve 14 is practiced using one of the thermoplastic piping options manufactured in accordance with the ASTM A-3408 standard or another accepted standard using virgin PE 3408 resin material in accordance with the ASTM D3350 standard or another virgin resin material in accordance with another accepted standard, and the metal pipe core 12 is manufactured in accordance with an accepted standard, the composite structural device 10 of the invention is fully compliant with accepted ASTM standards without further testing or certification.

Figure 2:
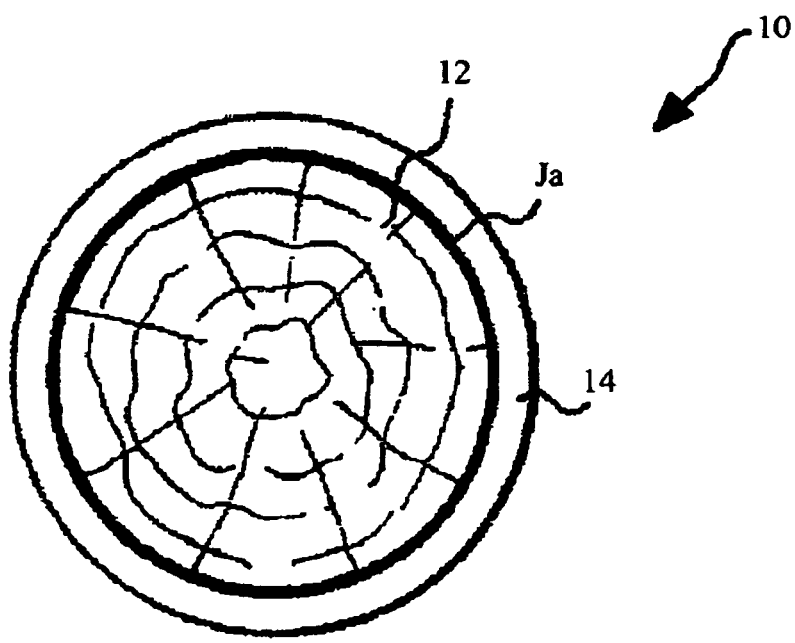
FIG. 2 is an end view that illustrates the composite structural device of the present invention wherein the elongated substantially cylindrical core is a solid core, such as a solid wooden or plastic pile.

FIG. 2 is an end view that illustrates the composite structural device 10 of the present invention wherein the elongated substantially cylindrical core 12 is a solid core, such as a solid wooden or plastic pile in contrast to the metal pipe core illustrated in FIG. 1. The solid core 12 is an elongated substantially cylindrical core having an outer peripheral skin formed of the sleeve 14 of seamless extruded or seam welded plastic pipe that is adhered to the core material by friction caused by radial compression.

Figure 3:
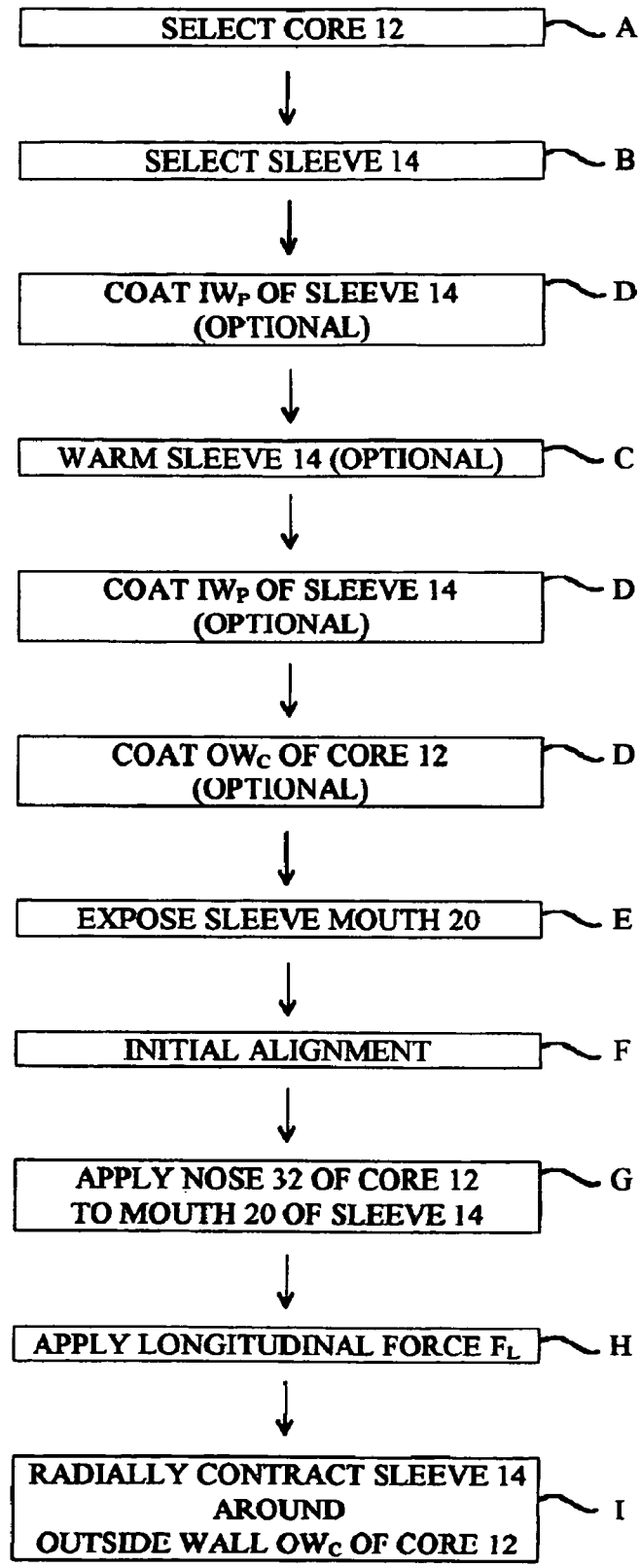
FIG. 3 is a flow diagram that illustrates the process of the invention whereby the composite structural device of the present invention is formed.

FIG. 3 is a flow diagram that illustrates the process of the invention whereby the composite structural device 10 of the present invention is formed.

Figure 4:
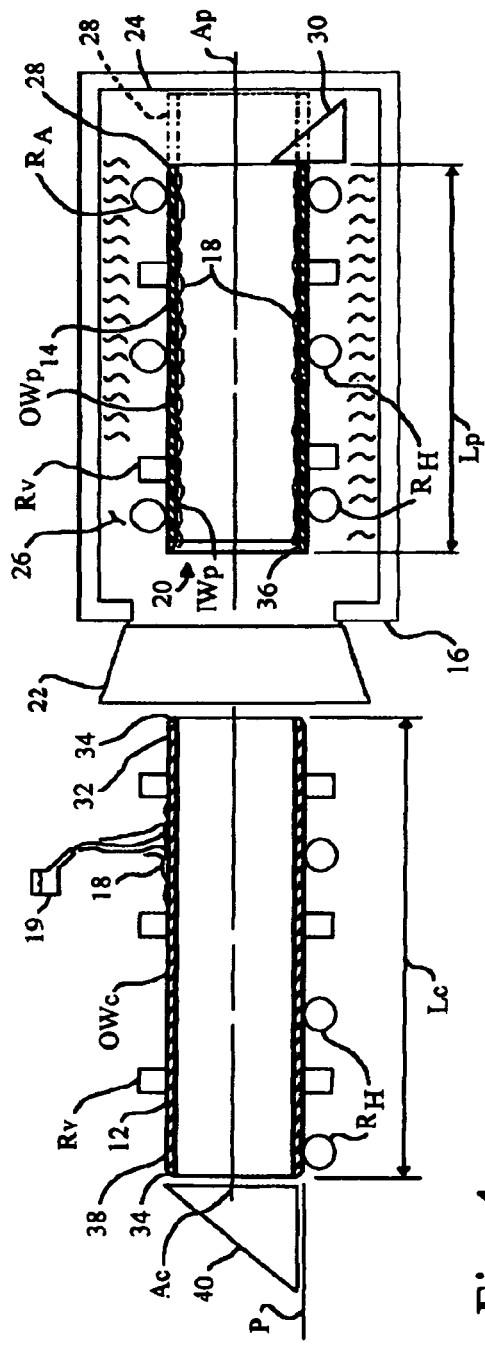
FIG. 4 illustrates the mechanical process of the invention prior to assembly of the core and plastic pipe sleeve.
Figure 5:
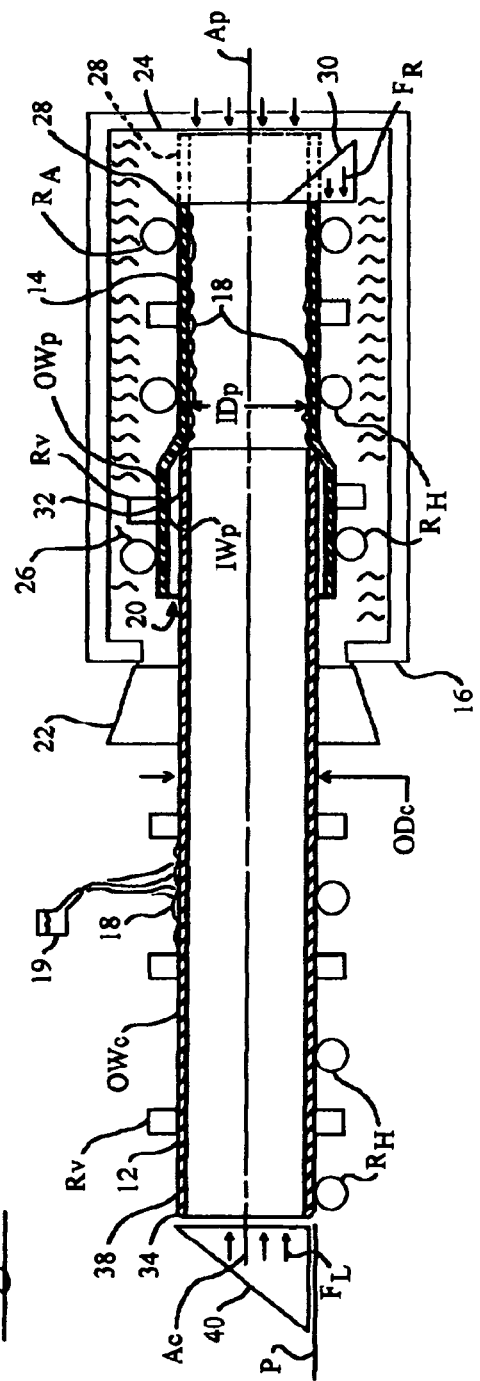
FIG. 5 illustrates one embodiment of the invention at an intermediate stage of assembly of the core and plastic pipe sleeve.
Figure 6:
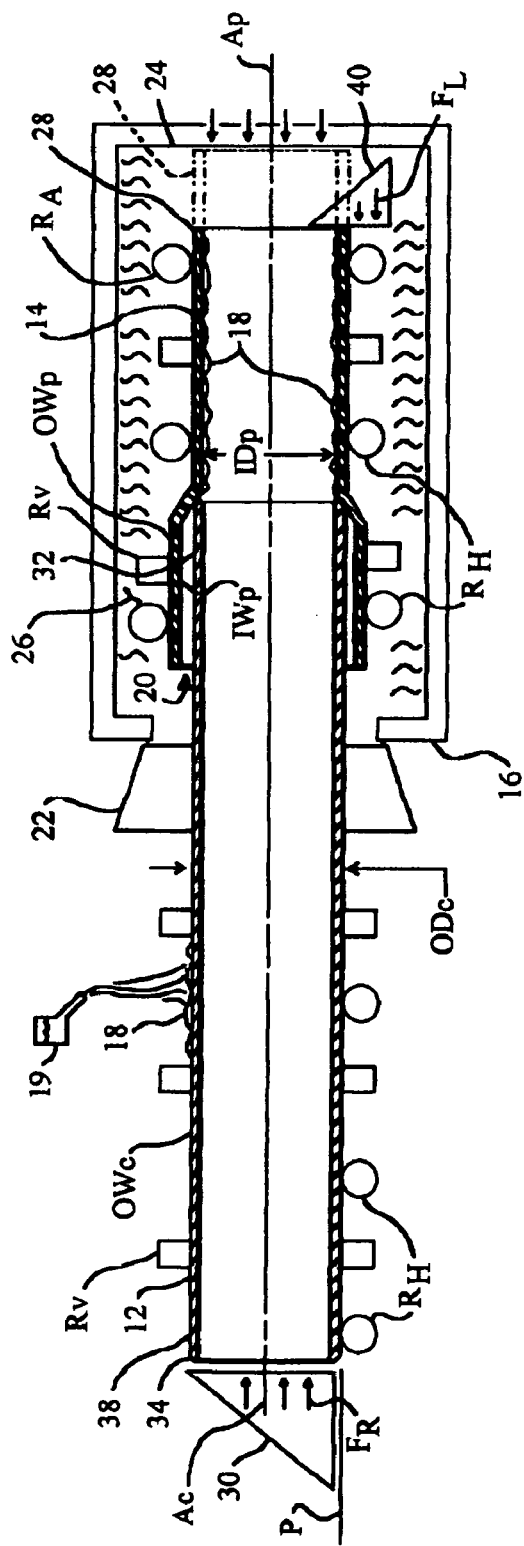
FIG. 6 illustrates an alternative embodiment of the invention at an intermediate stage of assembly of the core and plastic pipe sleeve.

FIGS. 4, 5, 6 and 7 are pictorial views that illustrate the mechanical process of the invention as illustrated in FIG. 3, whereby the composite structural device 10 of the present invention is formed. FIG. 4 illustrates the mechanical process of the invention prior to assembly of the core 12 and plastic pipe sleeve 14. FIG. 5 illustrates one embodiment of the invention at an intermediate stage of assembly of the core 12 and plastic pipe sleeve 14. FIG. 6 illustrates an alternative embodiment of the invention at an intermediate stage of assembly of the core 12 and plastic pipe sleeve 14.

In step A of the invention, an elongated substantially cylindrical core 12 is selected. The core 12 may be either a solid core of the type illustrated in FIG. 2, or a tubular pipe core of the type illustrated in FIG. 1. If the core 12 is a hollow pipe, it may be selected from any form or grade of ferrous or nonferrous pipe material manufactured according to an accepted ASTM standard, as discussed herein, and from any length appropriate to the end-user application. When an inner diameter of the end product is a desirable result, the pipe core 12 is selected having an inner diameter $ID_c$ of the desired dimension formed by an inner wall surface $IW_c$.

In step B of the invention, a plastic pipe sleeve 14 is selected from any plastic tube or pipe material that is radially expandable without tearing. According to one embodiment of the invention, the core 12 is selected from the family of HDPE piping materials. According to one embodiment of the invention, the plastic pipe sleeve 14 is a pipe is produced in accordance with ASTM A-3408 using HDPE 3408 material formed of virgin PE 3408 resin as specified in ASTM D3350 and contains carbon black for UV protection. The plastic pipe sleeve 14 is selected having a nominal inside diameter $ID_p$ before installation that is the same or slightly smaller than an outside diameter $OD_c$ of the selected core 12.

When the plastic pipe sleeve 14 is produced by extrusion, the inner wall surface $IW_p$ is sufficiently smooth to accept the core 12 with little or no drag. When the plastic pipe sleeve 14 is a pipe is produced in accordance with ASTM A-3408, it has an exceptionally smooth inner surface, and any heat-fused joints offer little drag or resistance within the pipe to acceptance of the core 12. Accordingly, a longitudinal force $F_L$ applied during installation of the plastic pipe sleeve 14 onto the steel pipe or other elongated substantially cylindrical core 12 is minimized.

Alternatively, if an outer diameter of the end product is a desirable result, the plastic pipe sleeve 14 is selected having an outer diameter $OD_p$ that, in a relaxed state prior to installation over the core 12, is the same or smaller than the desired outer diameter result, and the core 12 is selected having an outer diameter $OD_c$ that is the same or slightly larger than a normal inside diameter $ID_p$ of the plastic pipe sleeve 14.

Accordingly to one embodiment of the process of the invention, in a step C the plastic pipe sleeve 14 is optionally pre-warmed to a temperature above ambient but below a melting point of the sleeve material, e.g. below 240 degrees F. when the plastic pipe sleeve 14 is formed of HDPE PE 3408 pipe. Pre-warming the plastic pipe sleeve 14 is optional, but such pre-warming reduces the force $F_L$ applied during installation of the plastic pipe sleeve 14 onto the steel pipe or other elongated substantially cylindrical core 12, as discussed herein. Selection of pre-warming, and if present, pre-warming temperature is also a function of the "stretchability" of the plastic pipe sleeve 14. All relevant dimensions being equal, a plastic pipe sleeve 14 of a more stretchable material is more easily installed over a core 12 than a plastic pipe sleeve 14 of a less stretchable material. Thus, a plastic pipe sleeve 14 of a less stretchable material is optionally pre-warmed to a higher temperature than a plastic pipe sleeve 14 of a more stretchable material to reduce the force $F_L$ applied during installation of the plastic pipe sleeve 14 onto the core 12.

If present, pre-warming of the plastic pipe sleeve 14 may be practiced using any means available. For example, pre-warming of the plastic pipe sleeve 14 is practiced by immersion for a period of time in a liquid such as oil or water heated to a temperature above ambient but below a melting point of the sleeve material, or immersion in a similarly heated environment such as a steam bath. Pre-warming of the plastic pipe sleeve 14 is alternatively practiced by open flame, as produced by a gas-fired torch, or radiant heat from a bed of hot coals, as long as the plastic pipe sleeve 14 is not warmed above the melting point of the sleeve material. Pre-warming is alternatively practiced by allowing the plastic pipe sleeve 14 to stand or lie in a natural warming environment, for example, out doors in warm weather or under the direct rays of the sun. According to one embodiment of the invention, pre-warming is practiced by installing the plastic pipe sleeve 14 in an oven or other warming device 16 (hereinafter warming device 16) sized to accommodate the selected length $L_p$ of the section of plastic pipe sleeve 14 to be installed on the elongated core 12, which may be the same or less than the overall length $L_c$ of the elongated core 12. The warming device 16 is, for example, a tubular propane-fired oven, a natural gas or other gas-fired oven, an electric current oven such as an induction, arc or resistance oven, or an oven operated with a different heat source. The warming device 16 or other pre-warming means does not even have to heat the entire plastic pipe sleeve 14 to a uniform temperature throughout. Rather, one side can be pre-warmed to a much higher temperature than an opposite side, as in sun warming of a plastic pipe sleeve 14 lying on the ground. The invention may be practiced using nonuniform pre-warming at least, first, because pre-warming of the plastic pipe sleeve 14 is not a requirement of the installation process, second, because partial pre-warming is effective for softening and making more pliable at least that portion of the plastic pipe sleeve 14 that is so pre-warmed, third, because heat conduction through the material tends to equalize the temperature throughout the plastic pipe sleeve 14.

According to one embodiment of the invention, when the plastic pipe sleeve 14 is high-density polyethylene (HDPE) pipe, the plastic pipe sleeve 14 is pre-warmed to about 150 degrees F. which is above ambient but well below a melting point of the HDPE sleeve material.

In an optional step D of the invention, a lubricant 18 is applied to the inner wall surface $IW_p$ of the plastic pipe sleeve 14, either before or after pre-warming. The lubricant 18 operates as a means for overcoming frictional forces between the core 12 and plastic pipe sleeve 14 as a further optional means for minimizing or at least reducing the force $F_L$ applied during installation of the plastic pipe sleeve 14 onto the steel pipe or other elongated substantially cylindrical core 12, as discussed herein. The lubricant 18 is selected to avoid chemical interaction with either the material of the core 12 or the material of the plastic pipe sleeve 14. For example, if the plastic pipe sleeve 14 is selected to be HDPE pipe, carbon or petroleum based products are avoided for use as the lubricant 18 because such products are known to attack the cellular matrix of polyethylene piping materials and to cause softening of the materials over time, whereby the plastic pipe sleeve 14 tends to loose its pressure rating and rupture under load. According to one embodiment of the invention, the lubricant is instead selected to be a light vegetable oil.

According to one embodiment of the invention wherein the lubricant 18 is a light vegetable oil applied to the inside wall surface $IW_p$ of the plastic pipe sleeve 14, the plastic pipe sleeve 14 is pre-warmed to a temperature that is at least slightly below the cook-off temperature of the vegetable oil of about 160 degrees F. Accordingly, the plastic pipe sleeve 14 is pre-warmed to about 150 degrees F. which is well above ambient but still slightly below the cook-off temperature of the vegetable oil lubricant 18.

According to one alternative embodiment of the process of the invention illustrated in FIG. 3, the lubricant 18 is optionally applied to an outer wall surface $OW_c$ of the core 12, either instead or in combination with the lubricant 18 that is applied to the inner wall surface $IW_p$ of the plastic pipe sleeve 14 in optional step D of the invention. As described above, the lubricant 18 operates as a means for overcoming frictional forces between the core 12 and plastic pipe sleeve 14 as a further optional means for reducing the force $F_L$ applied during installation of the plastic pipe sleeve 14 onto the steel pipe or other elongated core 12, as discussed herein. As is further discussed herein, the lubricant 18 is selected to avoid chemical interaction with either the material of the core 12 or the material of the plastic pipe sleeve 14.

According to another alternative embodiment of the process of the invention illustrated in FIG. 3, the lubricant 18 is optionally applied to the outer wall surface $OW_c$ of the core 12 during installation of the plastic pipe sleeve 14. Accordingly, the lubricant 18 is applied to the outer wall surface $OW_c$ of the core 12 as or immediately before entry into the plastic pipe sleeve 14 by means of a lubricant dispenser 19 provided adjacent to where the core 12 meets the plastic pipe sleeve 14.

Preferably, the core 12 is not pre-warmed so that any thermal expansion due to such pre-warming is avoided.

In step E of the invention, a first open end or mouth 20 of the plastic pipe sleeve 14 is exposed. If the plastic pipe sleeve 14 is pre-warmed in a warming device 16 of a type having doors 22, the mouth 20 of the plastic pipe sleeve 14 is positioned in the warming device 16 such that, when the doors 22 are opened, the mouth 20 is exposed and available for installation over the core 12. According to one embodiment of the invention, the plastic pipe sleeve 14 optionally remains in the warming device 16 or other warming device as a means for retaining the temperature to which it has been pre-warmed. Alternatively, the plastic pipe sleeve 14 is removed from the warming device 16 prior to installation over the core 12.

In step F of the invention, a longitudinal axis $A_c$ of the core 12 is initially aligned with a longitudinal axis $A_p$ of the plastic pipe sleeve 14, whether the plastic pipe sleeve 14 remains in the warming device 16, or is removed previously therefrom. For example, the core 12 and plastic pipe sleeve 14 are both supported on a linear array of substantially horizontal rollers $R_H$ that extends continuously from a distance in front of the oven door 20 up to and through the oven door 20 into the oven or other warming device 16 and extends substantially to a back wall 24 of the warming device 16 opposite the door 20, whereby the outer wall surface $OW_c$ of the elongated core 12 and an outer wall surface $OW_p$ of the plastic pipe sleeve 14 are supported on a plane P defined by an operational surface of the horizontal rollers $R_H$ with the plastic pipe sleeve 14 installed in the warming device 16 where it is pre-warmed to the selected temperature, and with the elongated core 12 positioned outside the warming device 16 before the door 20. Linear arrays of rollers $R_H$ for such support are well-known in the pipe manufacturing arts as well as other material movement arts and are generally commercially available. Some commercially available systems of rollers R include two side-by-side linear arrays of rollers R with a second array being inclined relative to a first array such as to form an angle or "V" there between, whereby the core 12 and plastic pipe sleeve 14 are forced into mutual axial alignment. Alternatively, a block or stop is provided on one side of the array of horizontal rollers $R_H$ as a guide for aligning the core 12 and plastic pipe sleeve 14. According to one embodiment of the invention, a linear array of vertical rollers $R_V$ is provided beside the linear array of horizontal rollers $R_H$ to operate as a means for substantially horizontally aligning the longitudinal axes $A_c$ and $A_p$ of the core 12 and plastic pipe sleeve 14, while the linear array of horizontal rollers $R_H$ operates as a means for substantially vertically aligning the respective core and sleeve longitudinal axes $A_c$ and $A_p$.

Optionally, means are provided for radially supporting the pre-warmed plastic pipe sleeve 14 against buckling under the longitudinal insertion force $F_L$ applied during installation of the plastic pipe sleeve 14 onto the core 12. According to one embodiment of the invention, one or more additional rollers $R_A$ are provided in different positions around the outer periphery of the plastic pipe sleeve 14 as a means for radially supporting the pre-warmed plastic pipe sleeve 14. Alternatively, the physical constraints of one or more interior oven walls 26 operate as a means for radially supporting the pre-warmed plastic pipe sleeve 14.

Furthermore, a second end or foot 28 of the plastic pipe sleeve 14 is supported against longitudinal movement in a direction opposite the sleeve mouth 20. In other words, the foot 28 of the plastic pipe sleeve 14 is supported against being pushed away when the longitudinal force $F_L$ applied during installation of the plastic pipe sleeve 14 onto the core 12. For example, the foot 28 is positioned adjacent or proximate or even in actual butted contact with a block or other stop 30 located intermediate the oven door 22 and the back wall 24 of the warming device 16. Stop 30 is useful when the plastic pipe sleeve 14 is short as compared with the oven length between the door 22 and back wall 24. Stop 30 is also useful when the core 12 is intended to extend beyond the foot 28 of the plastic pipe sleeve 14, as discussed herein. Alternatively, the foot 28 of the plastic pipe sleeve 14 is positioned adjacent or proximate or even in actual butted contact with the back wall 24 of the warming device 16, whereby the back wall 24 operates as the stop 30. Accordingly, the core 12 and plastic pipe sleeve 14 are relatively aligned and positioned for insertion of the plastic pipe sleeve 14 over the core 12.

In step G of the invention, a first end or nose 32 of the core 12 is applied to the first end or mouth 20 of the plastic pipe sleeve 14 and the respective longitudinal axes $A_c$ and $A_p$ of the core 12 and plastic pipe sleeve 14 are accurately aligned. Optionally, either one or both of the core nose 32 and the sleeve mouth 20 is provided with a lead-in that operates as a means for more accurately aligning the respective longitudinal axes $A_c$ and $A_p$ of the core 12 and plastic pipe sleeve 14 than is provided by the manufacturing equipment during the initial alignment. The core 12 and plastic pipe sleeve 14 may have different respective outside diameters $OD_c$ and $OD_p$ depending upon such factors as the wall thickness of the plastic pipe sleeve 14 and degree of interference fit, i.e., radial compression, desired between the core 12 and plastic pipe sleeve 14. Therefore, the respective longitudinal axes $A_c$ and $A_p$ of the core 12 and plastic pipe sleeve 14 may be substantially but not accurately aligned by the horizontal rollers $R_H$ and vertical rollers $R_V$, if present. Also equipment tolerances and other vagaries common to manufacturing facilities may tend to slightly misalign the respective longitudinal axes $A_c$ and $A_p$ of the core 12 and plastic pipe sleeve 14. Therefore, according to one embodiment of the invention, when the core 12 is a pipe manufactured according to an accepted ASTM standard, as discussed herein, the nose 32 is normally provided with a 33 degree bevel nominally used in butt welding pipe. This bevel operates as a lead-in 34 for accurately aligning the respective longitudinal axes $A_c$ and $A_p$ of the core 12 and plastic pipe sleeve 14 and thereafter guiding the nose 32 of the core 12 into the interior of the plastic pipe sleeve 14. Stated differently, the lead-in 34 on the nose 32 operates to align the longitudinal axis $A_p$ of the plastic pipe sleeve 14 with the longitudinal axis $A_c$ of the core 12 and further to guide the plastic pipe sleeve 14 onto the core 12. When the core 12 is a solid core of the type illustrated in FIG. 2, the lead-in 34 is optionally cut on the nose 32. Alternatively, a lead-in 36 is provided on the plastic pipe sleeve 14 as an internal bevel around the mouth 20. The angle and depth of the respective lead-ins 34, 36 is selected as a function of several factors, including: the relative outside diameter $OD_c$ of the core 12; the inside diameter $ID_p$ of the plastic pipe sleeve 14; the sleeve wall thickness, i.e., difference of the inside and outside diameters $ID_p$, $OD_p$ of the plastic pipe sleeve 14; the initial alignment provided by the manufacturing equipment; as well as other factors affecting alignment. The angle and depth of the respective lead-ins 34, 36, if present, is selected also as a function of the degree of softening or "stretchability" of the plastic pipe sleeve 14 as provided by the material selected and, if present, the optional pre-warming provided in step C of the process.

In step H of the invention, the longitudinal force $F_L$ is applied as a means for driving the core 12 into the warming device 16 and the interior of the plastic pipe sleeve 14. The applied longitudinal force $F_L$ is sufficient for driving the core 12 into the plastic pipe sleeve 14 while simultaneously expanding the inside diameter $ID_p$ of the plastic pipe sleeve 14 sufficiently to receive the outside diameter $OD_c$ of the core 12. Because the core 12 is relatively rigid and substantially incompressible, the plastic pipe sleeve 14 expands during assembly with the core 12, and the core 12 does not compress. The applied longitudinal force $F_L$ necessary for installation of the plastic pipe sleeve 14 over the core 12 is as a function of several factors, including: the inside diameter $ID_p$ of the plastic pipe sleeve 14 relative to the outside diameter $OD_c$ of the core 12, whether the lubricant 18 is applied to one or both of the core 12 and plastic pipe sleeve 14; and the "stretchability" of the plastic pipe sleeve 14 as provided by the material selected and, if present, the degree of softening resulting from the optional pre-warming provided in step C of the process, as well as the length L, of the plastic pipe sleeve 14 to be installed as intersurface frictional forces increase with increased intersurface area.

The longitudinal force $F_L$ is supplied by any practical means to a second end or tail 38 of the core 12 opposite from the first end or nose 32. By example and without limitation, an electric, pneumatic or hydraulic other mechanical ram 40 is applied to the foot 30 of the core 12 to supply the longitudinal force $F_L$. Other means for applying the longitudinal force $F_L$ are also contemplated and are considered to be equivalent. For example, the longitudinal force $F_L$ is alternatively applied by gripping the tail 38 or outside wall $OW_p$ of the core 12 and pulling or dragging the core 12 into the warming device 16 and the plastic pipe sleeve 14. As the longitudinal force $F_L$ is applied to the core 12, the foot 28 of the plastic pipe sleeve 14 is pushed against the stop 30 which simultaneously applies an equal and opposite reaction force $F_R$ to the second end or foot 28 of the plastic pipe sleeve 14 as a means for maintaining the position of the plastic pipe sleeve 14 against slipping away under the applied longitudinal force $F_L$. Substantially continuous application of the longitudinal force $F_L$ to the core 12 thereafter drives part or all of the overall length $L_c$ of the core 12 into the plastic pipe sleeve 14.

When the lubricant 18 is present during installation, pressure generated by the close fit of the plastic pipe sleeve 14 over the incompressible rigid core 12 results in the mouth 20 of the plastic pipe sleeve 14 having a wiping effect against the outside wall surface $OW_c$ of the core 12 that effective removes or wipes away a greater portion of the lubricant 18. However, a sufficient quantity of lubricant 18 is retained to operate as a means for generating a thin, low friction interface between the inside wall surface $IW_p$ of the plastic pipe sleeve 14 and the outside wall surface $OW_c$ of the core 12 for easing the installation.

In tests, when the assembled composite structural device 10 of the invention was sectioned crosswise to the longitudinal axis, no lingering trace of the vegetable oil lubricant 18 was detected between the inside wall surface $IW_p$ of the plastic pipe sleeve 14 and the outside wall surface $OW_c$ of the core 12.

FIG. 6 illustrates an alternative embodiment of the invention wherein the ram 40 applies the longitudinal force $F_L$ to the foot 28 of the plastic pipe sleeve 14, while the stop 30 is positioned to apply the equal and opposite reaction force $F_R$ to the tail 38 of the core 12. According to this optional embodiment of the invention, the plastic pipe sleeve 14 is pre-warmed in the warming device 16, and after attaining the selected temperature, is driven out of the warming device 16 and onto the core 12.

Figure 7:
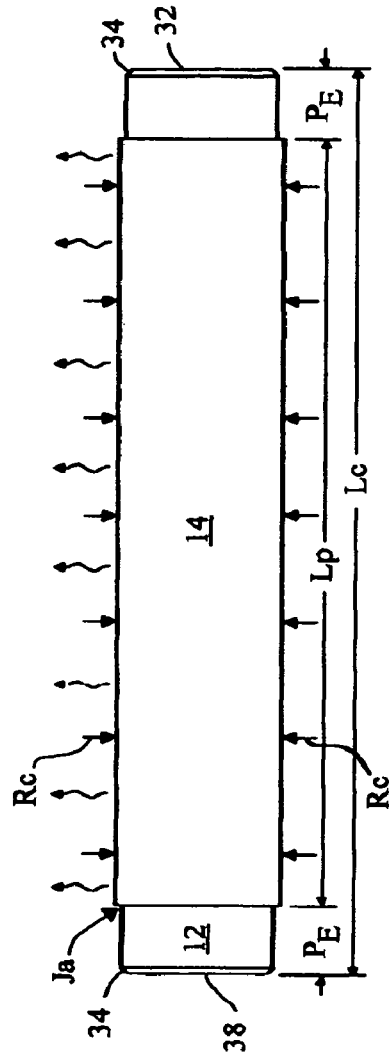
FIG. 7 illustrates one embodiment of the invention at an end stage of assembly of the core and plastic pipe sleeve.

FIG. 7 illustrates a radially contracting step I of the invention wherein the composite structural device 10 having the selected length $L_p$ of the plastic pipe sleeve 14 installed over the elongated cylindrical core 12 is cooled to ambient temperature as a means for radially compressing the plastic pipe sleeve 14 around the circumference of the outside wall $OW_p$ of the core 12. As the heat in the plastic pipe sleeve 14 dissipates, as indicated by the wavy heat dissipation arrows, whereby material size "memory" of the plastic pipe sleeve 14 causes the inner diameter $ID_p$ to return or "shrink," as indicated by the inwardly radial compression arrows Rc, to its nominal circumferential dimension after installation over the core 12 and upon return to ambient temperature. As a means for facilitating and accelerating cooling of the plastic pipe sleeve 14 and causing it to shrink around the core 12, the composite structural device 10 is optionally removed from the warming device 16 after assembly of the core 12 and plastic pipe sleeve 14, unless assembly was completed outside of the optional warming device 16, or the warming device 16 was not used. Removal from the warming device 16 also frees the warming device 16 for a next cycle of forming the composite structural device 10.

Shrinking of the plastic pipe sleeve 14, whether through material memory after being stretched to admit the core 12, or through cooling after removal from the warming device 16, causes the plastic pipe sleeve 14 to radially contract around the outer wall surface $OW_c$ of the core 12 forming a high compression interface between the outer wall surface $OW_c$ of the core 12 and the inner wall surface $IW_p$ of the plastic pipe sleeve 14. The radial compression loading at the interface is as a function of several factors, including: a difference between the inside diameter $ID_p$ of the plastic pipe sleeve 14 and the outside diameter $OD_c$ of the plastic pipe sleeve 14; the size memory of the material selected for the plastic pipe sleeve 14; and the wall thickness of the plastic pipe sleeve 14. Even minimal radial compression loading completely eliminates any annular separation between the core 12 and plastic pipe sleeve 14. Furthermore, as discussed herein, the process of the invention provides at least minimal radial compression loading that completely eliminates any annular separation between the core 12 and plastic pipe sleeve 14 along substantially the entire interface between the outer wall surface $OW_c$ of the core 12 and the inner wall surface $IW_p$ of the plastic pipe sleeve 14. Such minimal radial compression loading also operates as a means for adhering the plastic pipe sleeve 14 to the outer wall surface $OW_c$ of the core 12 by generating a frictional interface over substantially the entire intersurface area. Increasing the radial compression loading operates to increase the intersurface frictional adhesion by increasing the intersurface frictional forces.

Furthermore, the close or even interference fit of the core 12 and plastic pipe sleeve 14 necessitates the application of longitudinal force $F_L$ and reactive force $F_R$ prevents contaminants from entering the intersurface area between the outer wall surface $OW_c$ of the core 12 and the inner wall surface $IW_p$ of the plastic pipe sleeve 14. Therefore, the annular joint $J_a$ developed at the interface between the core 12 and plastic pipe sleeve 14 does not normally require protection, neither during assembly of the composite structural device 10 nor during circumferential contraction of the stretched plastic pipe sleeve 14 around the outer wall surface $OW_c$ of the core 12, whether the means for circumferential contraction is cooling or other material memory phenomenon.

As illustrated in FIG. 7 the plastic pipe sleeve 14 does not have to completely cover the core 12. Rather, according to one embodiment of the invention, a portion $P_E$ at each end of the core 12 is left exposed by the installed plastic pipe sleeve 14. The exposed portion $P_E$ permits butt welds or other circumferential joints $J_w$ between multiple composite pilings 10 into a longer string S of the type illustrated in FIG. 8. Thus, according to one embodiment of the invention, the composite structural device 10 is substantially symmetrical about a perpendicular centerline, $C_L$ with the plastic pipe sleeve 14 exposing a substantially identical length of exposed portion $P_E$ at both the nose 32 and tail 38 ends of the core 12.

Figure 8:
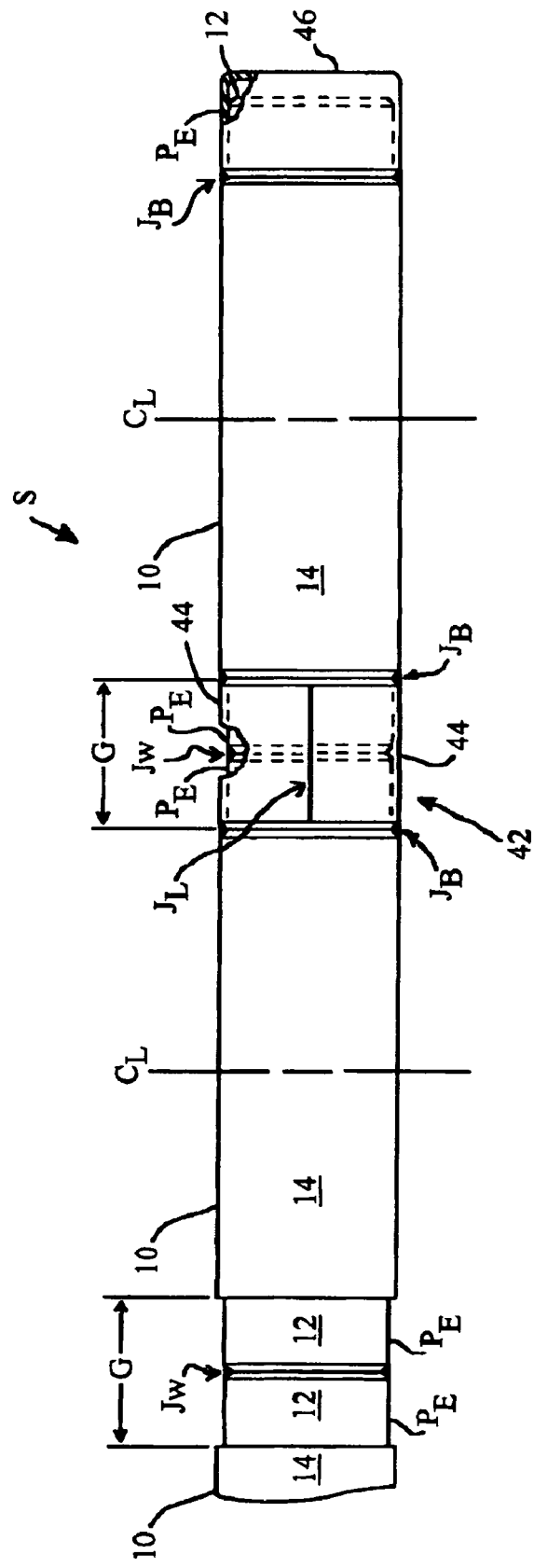
FIG. 8 illustrates an embodiment of the invention wherein two or more composite devices of the invention are joined by lengthwise joints into a longer string of such devices.

As illustrated in FIG. 8, two or more composite devices 10 are joined by lengthwise joints $J_w$ into a longer string S. Thereafter, a clam-shell union 42 of plastic piping material of substantially the same or chemically similar type as the material selected for the plastic pipe sleeve 14 is fitted over the exposed portions $P_E$ of the joined cores 12, including the butt weld or other lengthwise joint $J_w$ between adjacent composite pipes or pilings 10. The clam-shell union 42 is formed of two or more semi-cylindrical portions 44 of the selected piping material, each of the semi-cylindrical portions 44 being sized to substantially fill the gap G between the plastic pipe sleeves 14 of adjacent composite pipes of pilings 10 and further to cover substantially the entire outer surface areas of each exposed portion $P_E$ of the joined cores 12. The clam-shell portions 44 are thereafter thermal fusion plastic welded or chemically welded together in a water-tight manner (hereinafter "plastic welded") by means of lengthwise weld joints $J_L$, to form a tube or sleeve of plastic piping material around and completely covering the exposed portion $P_E$ of the joined cores 12. The clam-shell portions 44 are also plastic welded to the respective plastic pipe sleeve 14 on either core 12 in circumferential butt weld joints $J_B$. The lengthwise joints $J_w$ between multiple composite devices 10 and both the plastic lengthwise weld joints $J_L$, and the circumferential butt weld joints $J_B$ are accomplished in the field using techniques generally well-known to those of skill in the relevant art. Field welding of the cores 12 and the clam-shell union 42 permits multiple composite devices 10 to be transported to a site of use and assembled and installed in place. Installation of the clam-shell union 42 effectively seals the exposed portion $P_E$ of the joined cores 12 in the gap G between the plastic pipe sleeves 14 including the circumferential butt weld joints $J_B$. The clam-shell union 42 also permits the composite structural device 10 to manufactured in standard lengths, which reduces inventory costs.

When a non-standard or irregular length of composite structural device 10 is required for a particular application, the core 12 can be cut to the desired length and the plastic pipe sleeve 14 cut and peeled off to provide the exposed portion $P_E$ of the core 12 illustrated in FIG. 8 for joining to another core 12.

When the composite structural device 10 is not terminated with a valve or other device, as when it is used as a piling rather than a transmission pipe, the exposed portion $P_E$ of the core 12 is optionally sealed with an end cap 46 formed of a material that is the same or a compatible with the plastic material of which the plastic pipe sleeve 14 is formed. The end cap 46 is plastic welded to the plastic pipe sleeve 14 in a circumferential butt weld joint $J_B$. The end cap 46 protects the exposed portion $P_E$ of the core 12 and simultaneously protects the annular joint $J_a$ developed at the interface between the core 12 and plastic pipe sleeve 14, which is the weakest part of the composite structural device 10.

Figure 9:
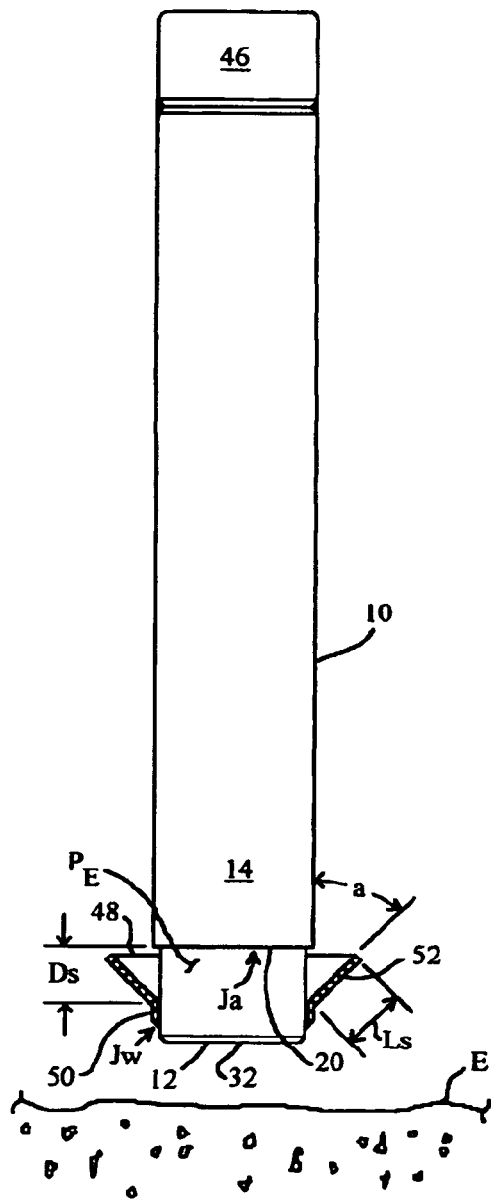
FIG. 9 illustrates one embodiment of the invention wherein a metal nose cone is provided in the exposed portion of the core to operate as a means for protecting and sealing the annular joint developed at the interface between the core and plastic pipe sleeve when the composite structural device is driven lengthwise into the earth or another medium.

FIG. 9 illustrates one embodiment of the invention wherein a metal nose cone 48 is provided in the exposed portion $P_E$ of the core 12 to operate as a means for protecting and sealing the annular joint $J_a$ developed at the interface between the core 12 and plastic pipe sleeve 14 when the composite structural device 10 is driven lengthwise into the earth or other medium E. The nose cone 48 has collar 50 from which a funnel-shaped metal skirt 52 extends. The nose collar 50 is coupled to the core 12 in the exposed portion $P_E$ adjacent to either the nose 32 or tail 38 with the skirt "hanging" or extending toward the plastic pipe sleeve 14. For example, a circumferential weld joint $J_w$ secures the collar 50 to the nose 32 or tail 38 of the elongated cylindrical core 12. According to one embodiment of the invention, the funnel-shaped metal skirt 52 is of similar material to the core 12 and yet thin enough to be sufficiently weak to fail and collapse while being driven lengthwise into the earth or other medium E, whereby the failed skirt 52 collapses about the mouth 20 (or foot 28) of the plastic pipe sleeve 14 and thereby protects the annular joint $J_a$ developed at the interface between the core 12 and plastic pipe sleeve 14, which is the weakest part of the composite structural device 10.

According to one embodiment of the invention, the skirt 52 is flared at an angle a of about 45 degrees from the collar 50. The nose cone 48 is sized such that, in combination with the location of the collar 50 relative to the plastic pipe sleeve 14, the skirt 52 is at least long enough to cover the mouth 20 (or foot 28) of the plastic pipe sleeve 14 upon collapse. For example, when the skirt 52 has a length $L_s$, the collar 50 of the nose cone 48 is positioned a distance $D_s$ from the plastic pipe sleeve 14 that is less than or equal to $(1/\sqrt{2}) \times L_s$ or $0.707 \times L_s$.

Figure 10:
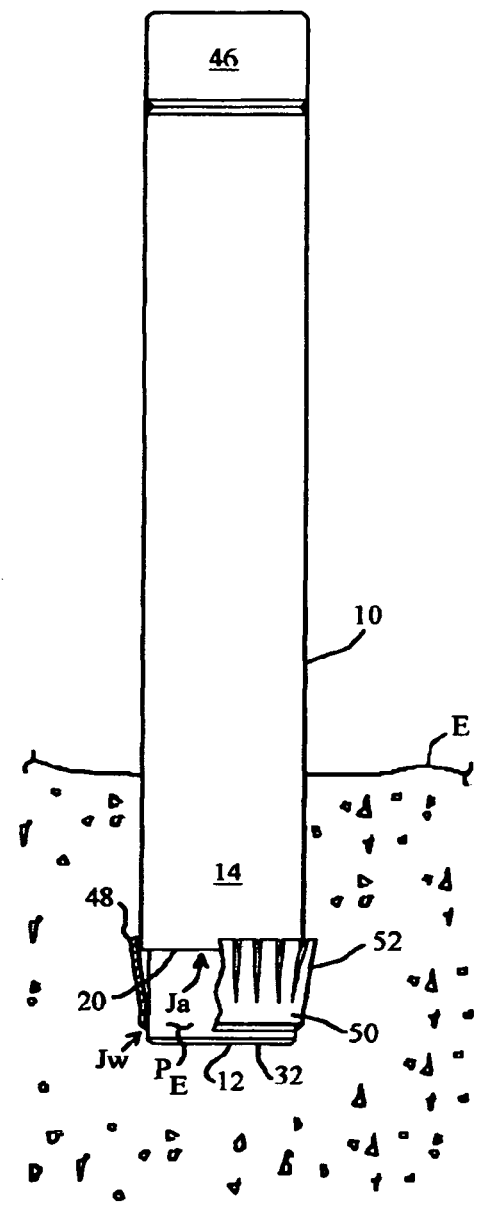
FIG. 10 illustrates the nose cone of the invention illustrated in FIG. 9 being collapsed about a portion of the exposed portion of the core and extending over a lip portion of the plastic pipe sleeve plastic pipe sleeve, whereby the nose cone protects the entrance to an annular joint at the interface between the core and plastic pipe sleeve.

FIG. 10 illustrates the nose cone 48 illustrated in FIG. 9 being collapsed about a portion of the exposed portion $P_E$ adjacent to the nose 32 (or tail 38) of the core 12 and extending over a lip portion 53 of the mouth 20 (or foot 28) of the plastic pipe sleeve plastic pipe sleeve 14, whereby the nose cone 48 protects against entrance of foreign matter into the annular joint $J_a$ at the interface between the core 12 and plastic pipe sleeve 14.

Figure 11:
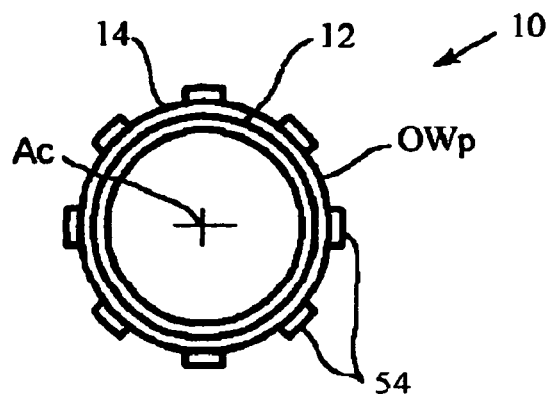
FIG. 11 illustrates one embodiment of the invention that is useful for the composite structural device being used as a piling wherein a quantity of supplemental rub strips are welded to the outer wall surface of the plastic pipe sleeve as a means for protecting the integrity of the plastic pipe sleeve in high wear applications.

FIG. 11 illustrates one embodiment of the invention that is useful for the composite structural device 10 being used as a piling. Accordingly, a quantity of supplemental rub strips 54 are coupled to the outer wall surface $OW_p$ of the plastic pipe sleeve 14 as a means for protecting the integrity of the plastic pipe sleeve 14 in high wear applications. For example, when used as a piling in a marina, heavy metal retaining hoops of a type well-known in the industry may be used to circle the composite structural device 10 for retaining a dock. In such an application, the retaining hoop and dock may both rub against the plastic pipe sleeve 14 of the composite structural device 10 as a function of fluctuating water levels, and in particular as a function of tidal motion. The supplemental rub strips 54 are slats formed of a material that is the same or a compatible with the plastic material of which the plastic pipe sleeve 14 is formed. The supplemental rub strips 54 are plastic welded to the plastic pipe sleeve 14 in a circumferential pattern in longitudinal alignment with the longitudinal axis $A_c$ of the core 12. Because the supplemental rub strips 54 are provided on the outer wall surface $OW_p$ of the plastic pipe sleeve 14, they forcibly space the retaining hoop and dock away from the plastic pipe sleeve 14. The supplemental rub strips 54 wear rather than the plastic pipe sleeve 14 so that the core 12 remains protected. When the supplemental rub strips 54 sufficiently worn to be in danger of exposing the plastic pipe sleeve 14 to wear, the supplemental rub strips 54 can be replaced, or additional supplemental rub strips 54 can be plastic welded over the worn strips 54.

Figure 12:
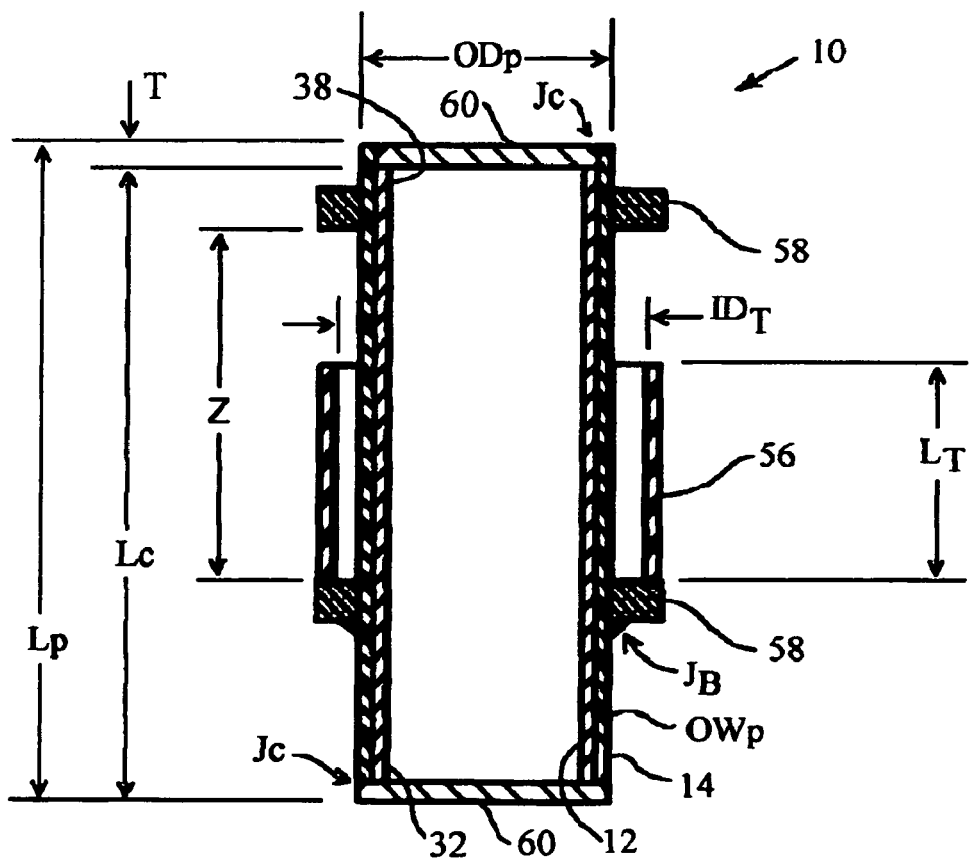
FIG. 12 illustrates another embodiment of the invention that is useful for the composite structural device being used as a piling wherein a traveler is provided over the outer wall surface of the plastic pipe sleeve as a means for protecting the integrity of the plastic pipe sleeve in high wear applications.

FIG. 12 illustrates another embodiment of the invention that is useful for the composite structural device 10 being used as a piling. Accordingly, a traveler 56 is provided over the outer wall surface $OW_p$ of the plastic pipe sleeve 14 as a means for protecting the integrity of the plastic pipe sleeve 14 in high wear applications, such as the marina application described herein. Accordingly, the traveler 56 is a length $L_T$ of plastic pipe having an inside diameter $ID_T$ that is sufficiently larger than the outside diameter $OD_p$ of the plastic pipe sleeve 14 to permit the traveler 56 to slide along the length $L_p$ of the plastic pipe sleeve 14 without interference. Additionally, a stop 58 is optionally coupled to the outer wall surface $OW_p$ of the plastic pipe sleeve 14 as a means for maintaining the traveler 56 within a selected range or zone Z. The supplemental rub strips 54 illustrated in FIG. 11 is optionally provided as the stop 58, wherein the strips 54 are sufficiently thick to interfere with travel of the traveler 56. Alternatively, the stop 58 is provided as a ring sized to fit closely with the outer wall surface $OW_p$ of the plastic pipe sleeve 14 and thick enough to simultaneously to interfere with travel of the traveler 56. For example, the stop 58 is a short section of thick-walled plastic pipe formed of a material that is the same or a compatible with the plastic material of which the plastic pipe sleeve 14 is formed and is plastic welded in a position that is selected to maintain the traveler 56 in the selected range or zone Z. When the traveler 56 is formed of a plastic of sufficiently low density to float in water, it will float up and down with fluctuation of the water. However, the user may find it useful to add a second stop 58 of the type described herein to operate as a means for limiting the overall motion of the traveler 56 to a controlled zone Z, which also interferes with unusual water levels, vandals or other phenomenon removing the traveler 56 from the composite structural device 10.

FIG. 12 also illustrates an alternative embodiment of the invention wherein the core 12 is completely enclosed and sealed within the plastic pipe sleeve 14 and a pair of end cap plates 60 formed of a material that is the same or a compatible with the plastic material of which the plastic pipe sleeve 14 is formed. As illustrated at the upper portion of FIG. 12, the length $L_p$ of the plastic pipe sleeve 14 is extended beyond the tail 38, i.e., the entire length $L_c$ of the core 12, by the thickness T of the cap plates 60. The cap plates 60 plastic sized to fit within the inside diameter $ID_p$ of the plastic pipe sleeve 14 and are welded thereto in a circumferential butt weld joint $J_C$.

Alternatively, as illustrated at the lower portion of FIG. 12, the length $L_p$ of the plastic pipe sleeve 14 is extended over the entire length $L_c$ of the core 12, but does not extend beyond the nose 32 of the core 12. The cap plates 60 are sized substantially the same as the outside diameter $OD_p$ of the plastic pipe sleeve 14 and are welded thereto using the circumferential butt weld joint $J_C$. The cap plates 60 according to one or both of the alternative embodiments are welded to the plastic pipe sleeve 14 and, in combination with the plastic pipe sleeve 14, completely encapsulate the core 12.

While the preferred embodiment of the invention has been illustrated and described, it will be appreciated that various changes can be made therein without departing from the spirit and scope of the invention. For example, materials may be substituted for the different components of the flexible support apparatus of the invention without departing from the spirit and scope of the invention. In another example, the inventor has actually practiced the process of the invention by nonuniformly pre-warming the plastic pipe sleeve 14 using a propane torch, installing the core 12 by applying the nose 32 of a pipe-type core 12 to the sleeve mouth 20, applied the longitudinal force $F_L$ by installing the pipe-type core 12 over a fork of a motorized fork-lift device and driving the fork-lift device toward the plastic pipe sleeve 14 with the sleeve foot pressed against a building wall as the stop 30 for applying the reactive force $F_R$ against which the longitudinal installation force $F_L$ was operated, and allowed the composite structural device 10 to cool in room ambient atmosphere. Therefore, the inventor makes the following claims.

What is claimed is:

1. A composite structural device, comprising:
    a substantially cylindrical rigid core; and
    an outer peripheral skin in a radially compressive relationship with the core, the outer peripheral skin being formed of a sleeve of weldable thermoplastic pipe, wherein the sleeve of thermoplastic pipe further comprises an initial inside diameter that is not larger than an outside diameter of the core when measured in a relaxed state prior to being assembled into the radially compressive relationship with the core.

2. The device of claim 1 wherein the sleeve of thermoplastic pipe further comprises an initial inside diameter that is smaller than an outside diameter of the core when measured in a relaxed state prior to being assembled into the radially compressive relationship with the core.

3. The device of claim 1 wherein the sleeve of thermoplastic pipe further comprises an overall length that is less than an overall length of the core.

4. The device of claim 3, further comprising a nose cone coupled to the core in a portion thereof exposed by the sleeve of thermoplastic pipe.

5. The device of claim 1 wherein the core is one of a solid cylindrical core, and a hollow pipe core.

6. The device of claim 1 wherein the sleeve of weldable thermoplastic pipe further comprises a length of high pressure piping material.

7. A composite structural device, comprising:
    an elongated substantially cylindrical rigid core; and
    a sleeve of weldable thermoplastic pipe assembled over an outside surface of the core, the pipe having a first relaxed state prior to being assembled over the outside surface of the core wherein an inside diameter thereof is smaller than an outside diameter of the core, and a second assembled state after being circumferentially stretched over the outside surface of the core wherein an inside diameter thereof is substantially the same as the outside diameter of the core.

8. The device of claim 7 wherein the assembled state of the sleeve further comprises the sleeve being in a radially compressive relationship with the core.

9. The device of claim 7 wherein the cylindrical rigid core further comprises one of a solid pile and a hollow pipe that is selected from ferrous pipe and nonferrous pipe.

10. The device of claim 7 wherein an end portion of the core is exposed beyond the sleeve, and further comprising a metal nose cone secured to the exposed end portion of the core.

11. A composite structural device, comprising:
    an elongated core comprising a substantially straight, rigid and cylindrical section;
    an elongated tubular sleeve comprising a weldable thermoplastic material and having an inside diameter as measured in a relaxed state that is the same or less than an outside diameter of the core;
    a longitudinal axis of the tubular sleeve being substantially aligned with a longitudinal axis of the core; and
    the sleeve being installed over at least a portion of the core, and the inside diameter of the sleeve being simultaneously expanded to substantially match the outside diameter of the core.

12. The device of claim 11 wherein the weldable thermoplastic of the tubular sleeve further comprises a weldable thermoplastic material that is radially expandable without tearing.

13. The device of claim 11 wherein the core further comprises one of a solid pile and a hollow pipe, the hollow pipe being one of a ferrous pipe and a nonferrous pipe.

14. The device of claim 13, further comprising a lubricant between the core and the sleeve.

15. The device of claim 14 wherein the lubricant further comprises a material that is substantially chemically inert relative to each of the core and the sleeve.

16. The device of claim 15 wherein the weldable thermoplastic material further comprises high-density polyethylene (HDPE) high pressure piping material.

17. The device of claim 16, further comprising an end portion of the core being exposed beyond the sleeve; and
    a metal nose cone secured to the exposed end portion of the core.

18. The device of claim 1, further comprising a lubricant between the core and the outer peripheral skin.

19. The device of claim 7, further comprising a lubricant between the core and the sleeve in the second assembled state.

* * * * *